United States Patent
Fukasawa et al.

(10) Patent No.: US 7,180,668 B2
(45) Date of Patent: *Feb. 20, 2007

(54) OPTICAL PICKUP DEVICE AND OPTICAL DISC DEVICE

(75) Inventors: Norio Fukasawa, Kanagawa (JP); Junichi Suzuki, Kanagawa (JP); Tetsu Tanaka, Tokyo (JP); Takeshi Kubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/085,355

(22) Filed: Mar. 21, 2005

(65) Prior Publication Data

US 2005/0163437 A1  Jul. 28, 2005

Related U.S. Application Data

(62) Division of application No. 10/220,922, filed as application No. PCT/JP02/00202 on Jan. 15, 2002, now Pat. No. 6,987,614.

(30) Foreign Application Priority Data

Jan. 12, 2001  (JP) ............................. P2001-005589

(51) Int. Cl.
   *G02B 27/44* (2006.01)
   *G02B 5/18* (2006.01)

(52) U.S. Cl. .................... 359/566; 359/569; 359/15; 359/19; 369/112.03; 369/112.09; 369/112.15; 369/112.21

(58) Field of Classification Search ................ 399/566, 399/569, 15; 369/112.12, 109.01, 112.15, 369/112.21

See application file for complete search history.

(56) References Cited

U.S. PATENT DOCUMENTS 6,483,650 B1 * 11/2002 Imai ........................... 359/814

* cited by examiner

*Primary Examiner*—Fayez G. Assaf
(74) *Attorney, Agent, or Firm*—Sonnenschein Nath & Rosenthal LLP

(57) ABSTRACT

This invention is an optical pickup device having a composite optical element (32) which has a first diffraction grating (45) for splitting a light beam emitted from a light source (31) into zeroth-order light, plus-first-order light and minus-first-order light, a second diffraction grating (46) for diffracting the optical path of a return light beam from an optical disc (2), and a split prism (47) arranged at a position where the minus-first-order light diffracted by the second diffraction grating (46) is incident and adapted for splitting the minus-first-order light into a plurality of light beams. It also has a light receiving unit (35) for acquiring a focusing error signal FE by receiving each return light beam split by the split prism (47) and for acquiring a tracking error signal by receiving return light beams from the optical disc (2) of the plus-first-order light and the minus-first-order light split by the first diffraction grating (45).

6 Claims, 10 Drawing Sheets

OPTICAL PICKUP DEVICE AND OPTICAL DISC DEVICE

RELATED APPLICATION DATA

The present application is a divisional of U.S. application Ser. No. 10/220,922, filed Dec. 19, 2002 now U.S. Pat. No. 6,987,614 and claims priority to PCT/JP02/00202 filed Jan. 15, 2002.

TECHNICAL FIELD

This invention relates to an optical pickup device and an optical disc device, and particularly to a composite optical element for splitting forward and backward optical paths, an optical pickup device having this composite optical element and used for recording or reproducing an information signal to or from an optical disc such as a magneto-optical disc or an optical disc, and an optical disc having this optical pickup device.

BACKGROUND OF THE INVENTION

Conventionally, an optical pickup device has been used for recording an information signal to or reproducing a recorded information signal from an optical disc, a magneto-optical disc or the like. The optical pickup device of this type has an optical system 101 constituted as shown in FIG. 1. The optical system 101 has, in the order of the optical path, a light source 111 for emitting a light beam for scanning a signal recording area of an optical disc 104, a diffraction grating 112 for splitting the light beam emitted from the light source 111, a beam splitter 113 for splitting the light beam and return light from the optical disc 104, an aperture diaphragm 114 for stopping down the light beam to a predetermined numerical aperture NA, an objective lens 115 for condensing the light beam lo the optical disc 104, and a light receiving unit 116 for receiving the return light beam reflected from the optical disc 104, as shown in FIG. 1.

A semiconductor laser is used as the light source 111, which emits a laser beam. The diffraction grating 112 splits the light beam emitted from the light source 111 into three beams made up of zeroth-order light, plus-first-order light and minus-first-order light, in order to acquire a tracking error signal by using a so-called three-beam method. The beam splitter 113 has a half mirror 119 for reflecting the light beam emitted from the light source 111 and for transmitting the return light from the optical disc 104, and thus splits the light beam from the light source 111 and the return light beam.

Although not shown, the light receiving unit 116 has a main beam photodetector for receiving the zeroth-order light split from the return light beam by the diffraction grating 112, and a set of side beam photodetectors for receiving the plus-first-order light and the minus-first-order light split from the return light beam by the diffracting grating 112, respectively.

As a method for detecting a focusing error signal, a so-called astigmatism method is used in the optical system 101. Therefore, a main beam photodetector 121 is formed with a substantially rectangular light receiving surface for receiving the return light and has a split pattern including light receiving areas $a_2$, $b_2$, $c_2$, $d_2$ which are formed by quadrisecting the light receiving surface along a set of dividing lines passing through the center of the light receiving surface and orthogonal to each other, as shown in FIGS. 2A, 2B and 2C. Although not shown, the side beam photodetectors are arranged at positions to face each other with the main beam photodetector 121 provided between them.

In the forward path from the light source 111 to the optical disc 104 of the optical system 101, the optical components are arranged so that an image point as a conjugate point of an emission point of the light source 111 as an object point is situated on a recording surface 105 of the optical disc 104, as shown in FIG. 1

In the backward path from the optical disc 104 to the light receiving unit 116 of the optical system 101, the optical components are arranged so that an image point as a conjugate point of a point on the recording surface 105 of the optical disc 104 as an object point is situated on the light receiving surface of the main beam photodetector 121 of the light receiving unit 116.

Therefore, in the optical system 101, the emission point of the light source 111 and the point on the light receiving surface of the main beam photodetector 121 of the light receiving unit 116 are conjugate with each other.

A method of acquiring a focusing error signal from the light receiving areas $a_2$, $b_2$, $c_2$, $d_2$ of the above-described main beam photodetector 121 will now be described.

First, if the objective lens 115 is situated at an optimum position with respect to the recording surface 105 of the optical disc 104 and is in focus with respect to the recording surface 105 of the optical disc 104, that is, if the objective lens 105 is in an accurate focusing state, the shape of a beam spot on the light receiving surface of the main beam photodetector 121 is circular, as shown in FIG. 2B.

If the objective lens 115 is too close to the recording surface 105 of the optical disc 104, the objective lens 115 gets out of focus and the return light passing through the beam splitter 113 generates astigmatism, which causes the shape of a beam spot on the light receiving surface of the main beam photodetector 121 to be elliptical with its long axis extending into the light receiving areas $a_2$ and $c_2$, as shown in FIG. 2A.

Moreover, if the objective lens 115 is too far from the recording surface 105 of the optical disc 104, the objective lens 115 gets out of focus and the return light passing through the beam splitter 113 generates astigmatism, which causes the shape of a beam spot on the light receiving surface of the main beam photodetector 121 to be elliptical with its long axis extending into the light receiving areas $b_2$ and $d_2$, as shown in FIG. 2C. This elliptical shape has its long axis inclined by 90 degrees from the above-described shape of the beam spot shown in FIG. 2A.

When the return light outputs from the light receiving areas $a_2$, $b_2$, $c_2$, $d_2$ of the main beam photodetector 121 are expressed by $Sa_2$, $Sb_2$, $Sc_2$, $Sd_2$, a focusing error signal FE is calculated by the following equation (1).

$$FE=(Sa_2+Sc_2)-(Sb_2+Sd_2) \quad (1)$$

Specifically, if the objective lens 115 is situated at the focusing position, that is, if the objective lens 115 is in the accurate focusing state, as shown in FIG. 2B, the focusing error signal FE acquired by the main beam photodetector 121 by calculating the above-described equation (1) is 0.

If the objective lens 115 is too close to the recording surface 105 of the optical disc 104, the focusing error signal FE acquired by the main beam photodetector 121 is positive. If the objective lens 115 is too far from the recording surface 105 of the optical disc 104, the focusing error signal FE is negative.

A tracking error signal TE is acquired, as the side beam photodetectors receive the plus-first-order light and the minus-first-order light split by the diffracting grating 112 and the difference between the outputs of the side beam photodetectors is calculated.

In the optical pickup device having the optical system 101 constituted as described above, the objective lens 115 is driven and displaced on the basis of the focusing error signal FE acquired by the main beam photodetector 121 of the light receiving unit 116 and the tracking error signal TE acquired by the side beam photodetectors. Thus, the objective lens 115 is moved to the focusing position with respect to the recording surface 105 of the optical disc 104 and the light beam is focused on the recording surface 105 of the optical disc 104, thereby reproducing information from the optical disc 104.

In the optical system 101 provided in the above-described optical pickup device, if the center of the beam spot cast onto the light receiving surface of the main beam photodetector 121 is slightly deviated in any direction from the center of the main beam photodetector 121 as shown in FIG. 3 when acquiring the focusing error signal FE by the above-described light receiving unit 116, the output in the case of the accurate focusing state is no longer 0 and an offset is consequently given to the focusing error signal FE.

The optical system 101 has a problem that since the focusing control is carried out so that the focusing error signal FE becomes 0, the objective lens 115 cannot be controlled to be driven to the accurate focusing position.

In the above-described optical pickup device, the center of quadrisecting of the light receiving surface of the main beam photodetector 121 must be situated accurately at the position conjugate with the emission point of the light source 111 in order to acquire an appropriate focusing error signal FE which enable control of the objective lens 115 to an appropriate position.

To secure high position accuracy of the light receiving unit 116 with respect to the light source 111 as described above, the position accuracy of the light receiving surface of the main beam photodetector 121 must be strictly, controlled with respect to, for example, the position standard of a package, when manufacturing the main beam photodetector 121.

Therefore, the above-described optical system 101 is a hindrance to reduction in the manufacturing cost of the light receiving elements such as the main beam photodetector 121 and improvement in the productivity of the assembly process of the optical pickup device. Consequently, it may cause an obstruction to reduction in the manufacturing cost of the optical pickup device itself or may lower the quality of the optical pickup device.

SUMMARY OF THE INVENTION

Thus, it is an object of the present invention to provide a composite optical element, an optical pickup device and an optical disc device which enable improvement in the productivity, reduction in the manufacturing cost and improvement in the reliability of a focusing error signal.

A composite optical element according to the present invention comprises: a diffraction element for transmitting a light beam emitted from a light source and diffracting a return light beam from an optical disc; and light splitting means arranged at a position where the return light beam diffracted by the diffraction element is incident and adapted for splitting the return light beam into a plurality of beams and leading the plurality of beams to light receiving means having a plurality of light receiving areas.

In the composite optical element according to the present invention, a light beam emitted from the light source is lead to the optical disc and a return light beam is diffracted by the diffraction element. The return light beam diffracted by the diffraction element is split into a plurality of beams by the light splitting means and the return light beam split by the light splitting means is led to the light receiving means having the plurality of light receiving areas in order for an optical pickup device to acquire a focusing error signal.

An optical pickup device according to the present invention comprises: a light source for emitting light of a predetermined wavelength; an objective lens for condensing the light beam emitted from the light source onto an optical disc and condensing a return light beam from the optical disc; a composite optical element having a diffraction element for transmitting the light beam emitted from the light source and diffracting the return light beam from the optical disc, and light splitting means arranged at a position where the return light beam diffracted by the diffraction element is incident and adapted for splitting the return light beam into a plurality of beams; and light receiving means for receiving each return light beam split by the light splitting means, in a plurality of light receiving areas, in order to acquire a focusing error signal.

In this optical pickup device, a light beam emitted from the light source is condensed onto the optical disc by the objective lens and a return light beam from the optical disc is diffracted by the diffraction element in the composite optical element and thus separated from the optical path of the light beam. In the optical pickup device, the return light beam diffracted by the diffraction element is split into a plurality of beams by the light splitting means in the composite optical system and each split return light beam is received in the plurality of light receiving areas of the light receiving means, thus acquiring a focusing error signal.

An optical disc device according to the present invention has an optical pickup for recording and/or reproducing information signals to and/or from an optical disc, and disc rotational driving means for rotationally driving the optical disc. The optical pickup comprises: a light source for emitting light of a predetermined wavelength; an objective lens for condensing the light beam emitted from the light source onto the optical disc and condensing a return light beam from the optical disc; a composite optical element having a diffraction element for transmitting the light beam emitted from the light source and diffracting the return light beam from the optical disc, and light splitting means arranged at a position where the return light beam diffracted by the diffraction element is incident and adapted for splitting the return light beam into a plurality of beams; and light receiving means for receiving each return light beam split by the light splitting means, in a plurality of light receiving areas, in order to acquire a focusing error signal.

In the optical disc device according to the present invention, the optical disc is rotationally driven by the disc rotational driving means and recording and/or reproduction of information is carried out by the optical pickup. In the optical pickup, light beam emitted from the light source is condensed onto the optical disc by the objective lens and a return light beam from the optical disc is diffracted by the diffraction element in the composite optical element and thus separated from the optical path of the light beam. In the optical pickup, the return light beam diffracted by the diffraction element is split into a plurality of beams by the light splitting means in the composite optical system and each split return light beam is received in the plurality of light receiving areas of the light receiving means, thus acquiring a focusing error signal.

The other objects of the present invention and specific advantages provided by the present invention will be clarified further from the following description of embodiments.

BRIEF DESCRIPTION OF THE DRAWINGS

FIG. 2A shows the state where an objective lens is close to an optical disc. FIG. 2B shows the state where the objective lens is situated at a focusing position. FIG. 2C shows the state where the objective lens is far from the optical disc.

FIG. 6A shows the state where an objective lens is close to an optical disc. FIG. 6B shows the state where the objective lens is situated at a focusing position. FIG. 6C shows the state where the objective lens is far from the optical disc.

FIG. 11A shows the state where an objective lens is close to an optical disc. FIG. 11B shows the state where the objective lens is situated at a focusing position. FIG. 11C shows the state where the objective lens is far from the optical disc.

DETAILED DESCRIPTION OF THE PRESENTLY PREFERRED EMBODIMENTS

An optical disc device to which the present invention is applied will now be described with reference to the drawings.

Figure 1:
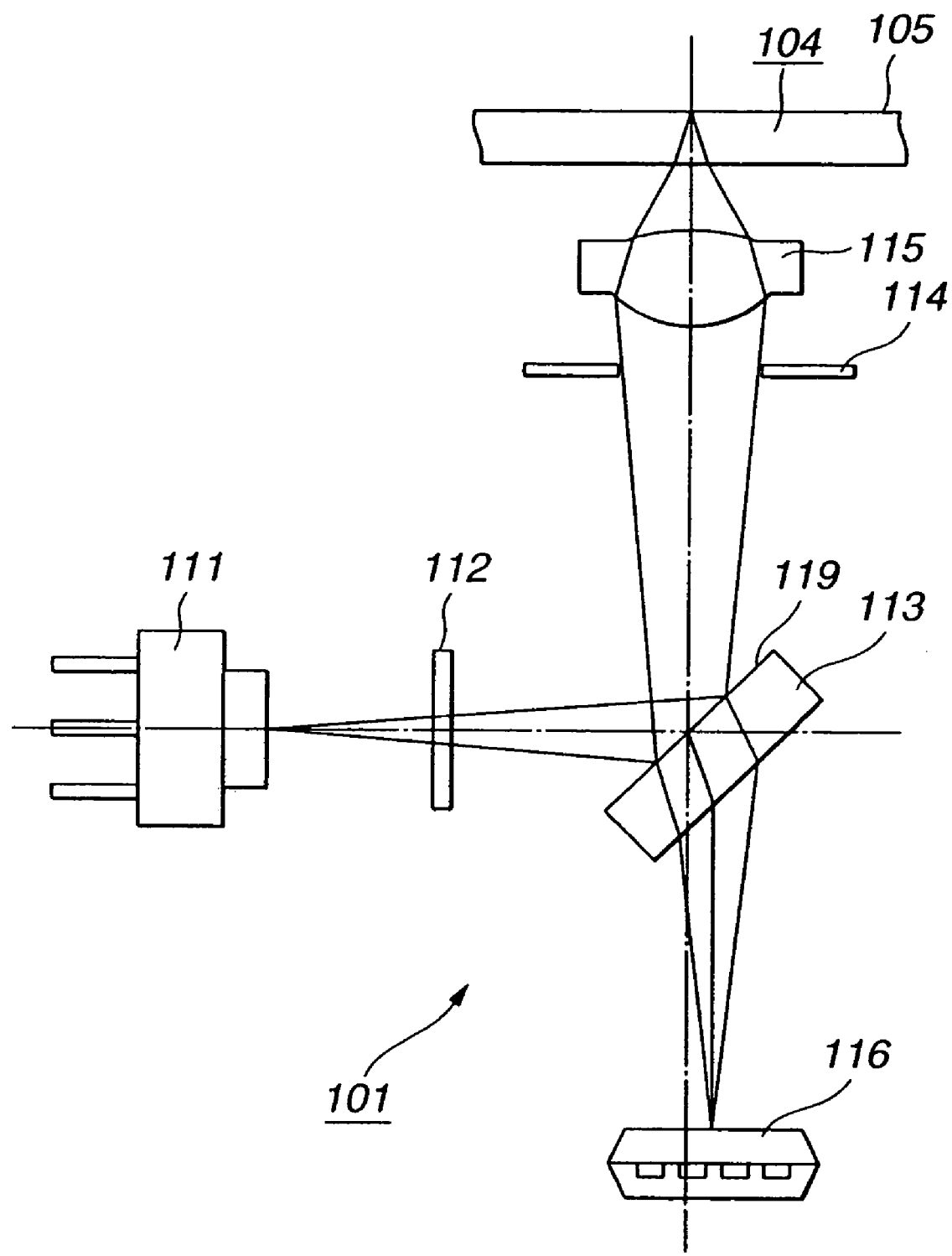
FIG. 1 is a schematic view showing an optical system provided in a conventional optical pickup device.
Figure 2A:
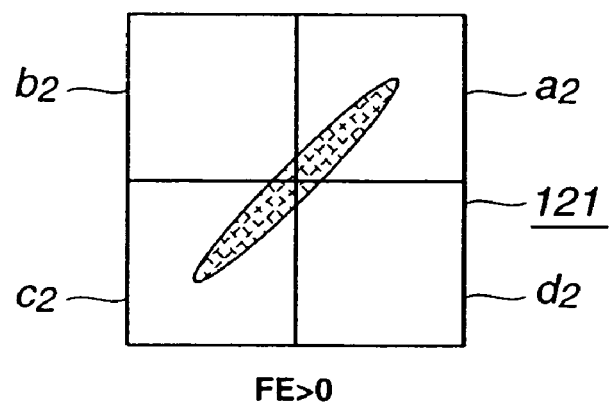
FIGS. 2A to 2C show beam spots in light receiving areas of a main beam photodetector of the conventional optical system.
Figure 2B:
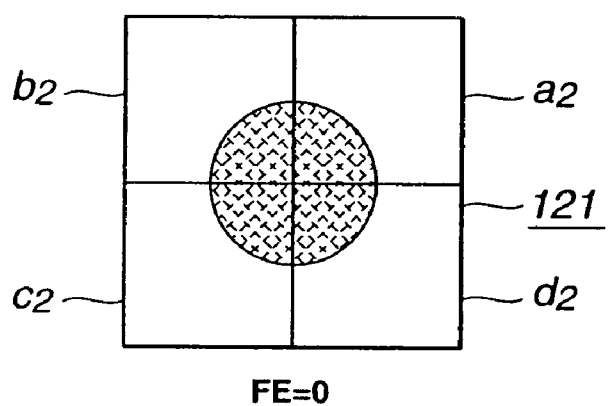
Figure 2C:
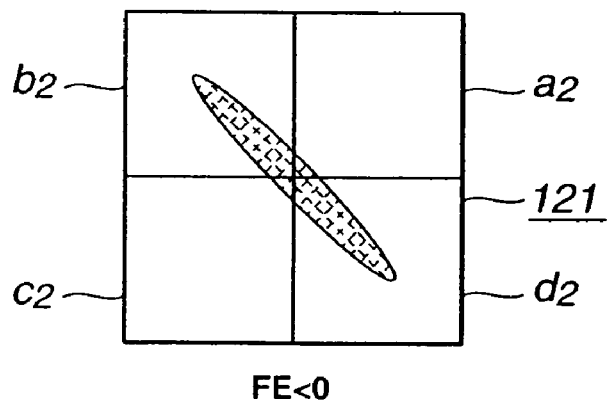
Figure 3:
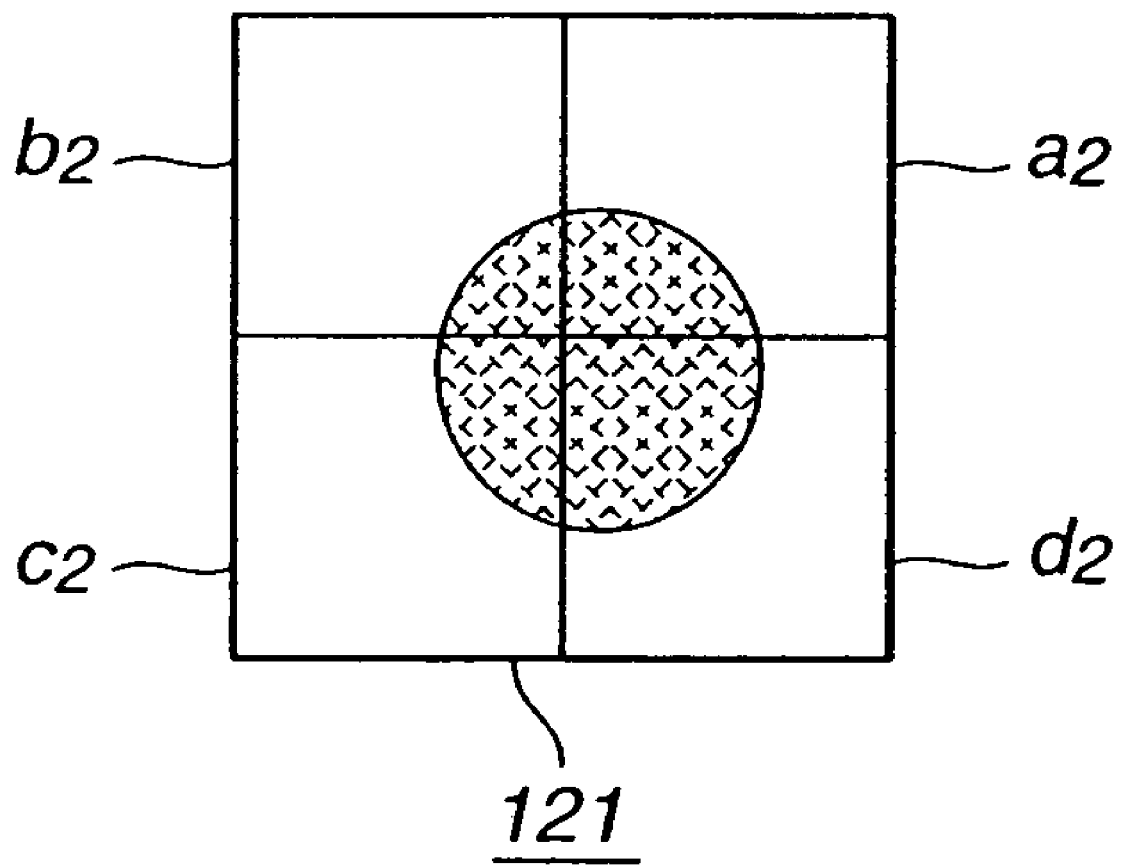
FIG. 3 shows the state where the center of the beam spot is deviated from the center of the light receiving surface of the main beam photodetector of the conventional optical system.
Figure 4:
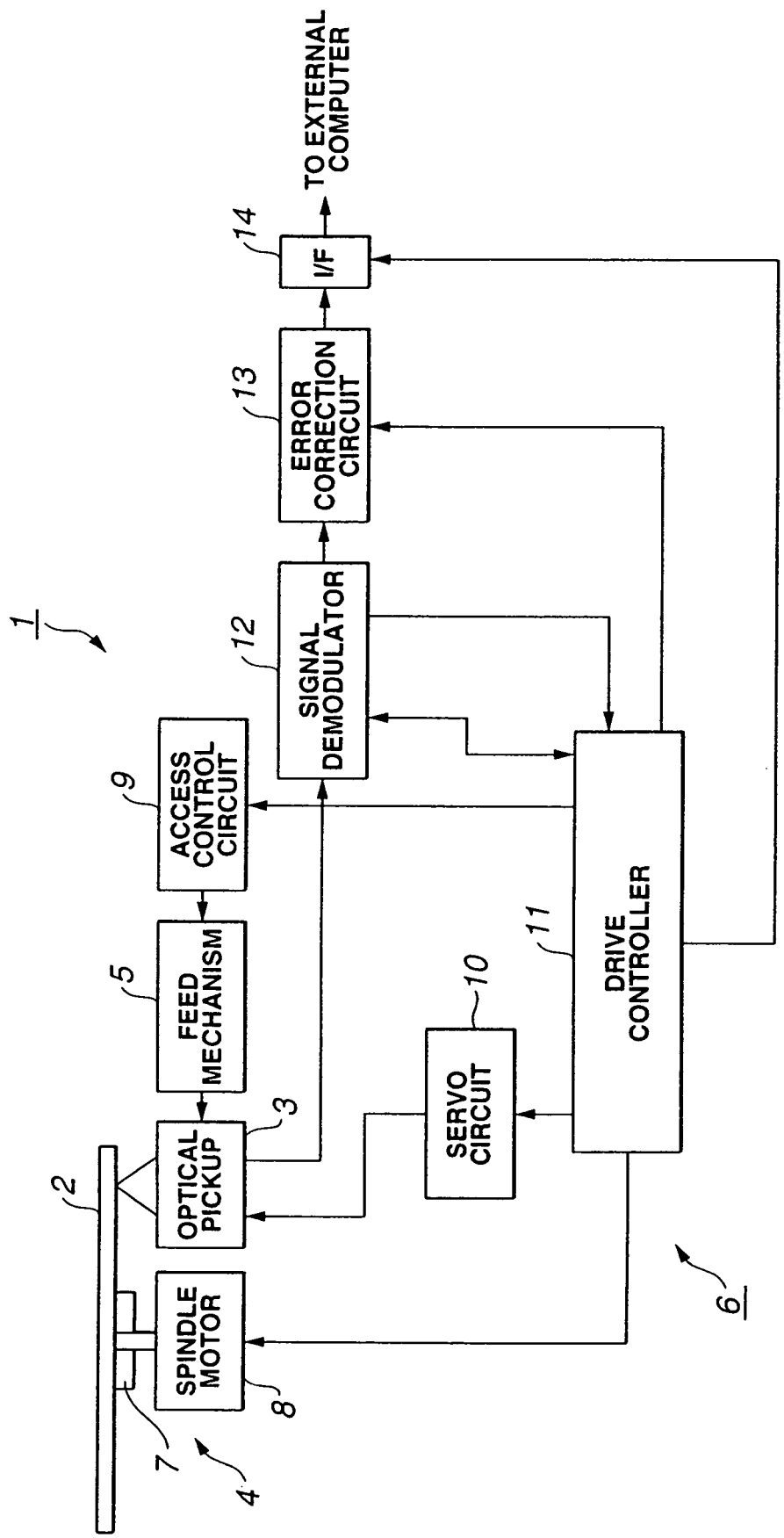
FIG. 4 is a circuit block diagram showing an optical disc device according to the present invention.

An optical disc device 1 carries out recording or reproduction of information to or from an optical disc 2 such as CD (compact disc), DVD (digital versatile disc), CD-R (compact disc-recordable) on which information can be written once, CD-RW (compact disc-rewritable) on which information can be rewritten, or a magneto-optical disc, as shown in FIG. 4.

The optical disc device 1 has an optical pickup 3 for recording/reproducing information to/from the optical disc 2, a disc rotational driving mechanism 4 for rotationally driving the optical disc 2, a feed mechanism 5 for moving the optical pickup 3 in a radial direction of the optical disc 2, and a control unit 6 for controlling the optical pickup 3, the disc rotational driving mechanism 4 and the feed mechanism 5.

The disc rotational driving mechanism 4 has a disc table 7 on which the optical dis 2 is set, and a spindle motor 8 for rotationally driving the disc table 7. The feed mechanism 5 has a supporting base for supporting the optical pickup 3, a main shaft and a sub shaft for movably supporting the supporting base, and a thread motor for moving the supporting base, though not shown.

The control unit 6 has an access control circuit 9 for controlling the driving of the feed mechanism 5 and thus controlling the position of the optical pickup 3 with respect to the radial direction of the optical disc 2, a servo circuit 10 for controlling the driving of a biaxial actuator of the optical pickup 3, and a drive controller 11 for controlling the access control circuit 9 and the servo circuit 10, as shown in FIG. 4. The control unit 6 also has a signal demodulation circuit 12 for demodulating a signal from the optical pickup 3, an error correction circuit 13 for correcting an error of the demodulated signal, and an interface 14 for outputting the error-corrected signal to an electronic equipment such as an external computer.

In the optical disc device 1 constituted as described above, the disc table 7 on which the optical disc 2 is set is rotationally driven by the spindle motor 8 of the disc rotational driving mechanism 4, and the feed mechanism 5 is controlled in driving in accordance with a control signal from the access control circuit 9 of the control unit 6 so as to move the optical pickup 3 to a position corresponding to a desired recording track of the optical disc 2, thereby recording or reproducing information to or from the optical disc 2.

The above-described optical pickup 3 will now be described in detail.

Figure 5:
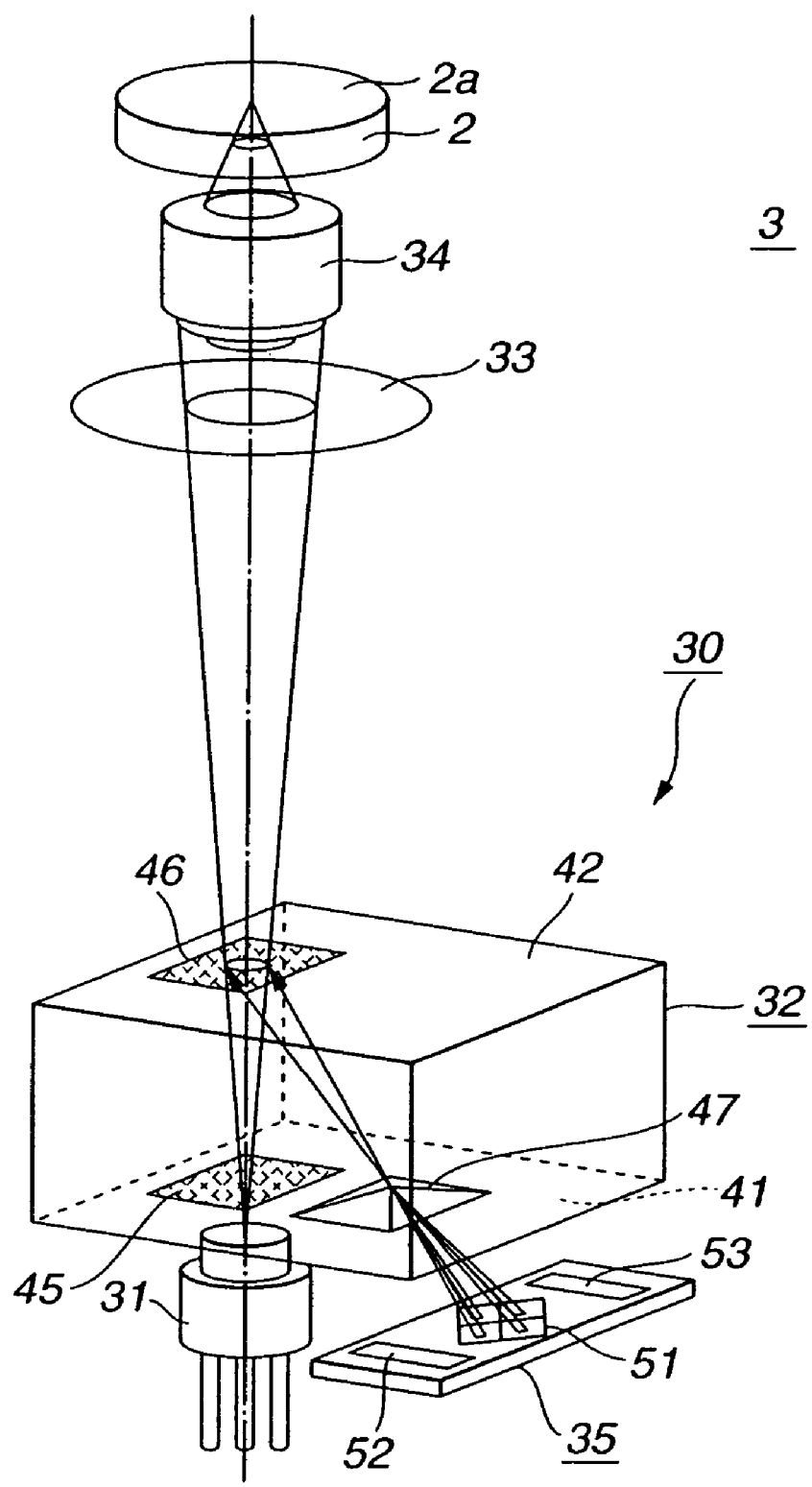
FIG. 5 is a perspective view showing an optical pickup provided in the optical disc device according to the present invention.

The optical pickup 3 has an optical system 30 for reproducing information from the optical disc 2, as shown in FIG. 5, and a lens driving mechanism, not shown, for driving and displacing an objective lens of the optical system 30, which will be described later.

The optical system 30 of the optical pickup 3 has the following elements in the order of the optical path: a light source 31 for emitting a laser beam; a composite optical element 32 for splitting the light beam emitted from the light source 31, diffracting a return light beam reflected from a signal recording surface of the optical disc 2, and splitting the return light beam; an aperture diaphragm 33 for stopping down the light beam which is emitted from the light source 31 and transmitted through the composite optical element 32, to a predetermined numerical aperture NA; an objective lens 34 for condensing the light beam stopped down by the aperture diaphragm 33 onto a recording surface 2a of the optical disc 2; and a light receiving unit 35 for receiving the return light beam which is transmitted through the composite optical element 32 and reflected from the optical disc 2.

As the light source 31, a semiconductor laser for emitting a laser beam with a wavelength of, for example, approximately 780 nm, is used.

The composite optical element 32 is formed, for example, by injection-molding of a resin material. The composite optical element 32 has a first surface 41 which is exposed to the light source 31 and is orthogonal to the optical axis of the light beam emitted from the light source 31, and a second surface 42 facing the first surface 41 in parallel.

On the first surface 41, a first diffraction grating 45 is provided which splits the light beam emitted from the light source 31 into three beams made up of zeroth-order light, plus-first-order light and minus-first-order light. The optical system 30 employs a so-called three-spot method (three-beam method) in order to acquire a tracking error signal TE, and is constituted to carry out tracking servo by detecting the difference between the outputs of the plus-first-order light and the minus-first-order light.

On the second surface 42, a second diffraction grating 46 is provided which further splits the zeroth-order light from the first diffraction grating 45, of each return light beam from the optical disc 2, into zeroth-order light, plus-first-order light and minus-first-order light and thus diffracts the return light beam so as to lead one of the plus-first-order light and the minus-first-order light to the light receiving unit 35.

On the first surface 41, for example, on the optical path of the minus-first-order light diffracted by the second diffraction grating 46, a split prism 47 for quadrisecting this minus-first-order light is provided.

The split prism 47 is arranged adjacently to one side of the first diffracting grating 45. The split prism 47 is formed substantially in the shape of a regular four-sided pyramid and is arranged so that the center of the minus-first-order light diffracted by the second diffraction grating 46 becomes incident on the center of the vertical angle of the regular four-sided pyramid at or near the focal point of the diffracted light.

The split prism 47 is provided on the inner side of the composite optical element 32 so as to face the vertical angle. That is, the split prism 47 is arranged so that the minus-first-order light split by the second diffraction grating 46 from the zeroth-order light of the three beams split by the first diffraction grating 45 becomes incident on the vertical angle. The split prism 47 may also be arranged so that the bottom of the regular four-sided pyramid is orthogonal to the optical axis of the minus-first-order light diffracted by the second diffraction grating 46.

As the return light beam diffracted by the second diffraction grating 46 passes through the composite optical element 32, a predetermined quantity of astigmatism is given to the return light beam incident on the split prism 47. By adjusting the position in the direction of the optical axis of the light beam emitted from the light source 31, the composite optical element 32 can easily adjust defocusing with respect to the optical disc 2.

The composite optical element 32 is formed by injection-molding of a resin material. As other forming methods, the above-described first diffraction grating 45, second diffraction grating 46 and split prism 47 may be formed by an etching process or by a mechanical process. The material forming the composite optical element 32 is not limited to a resin material and may be an optically transparent material such as a glass material. Moreover, the material constitution may be partially changed by combining the optical materials.

The aperture diaphragm 33 is arranged on the optical axis of the light beam transmitted through the second diffraction grating 46 of the composite optical element 32.

The objective lens 34 is constituted by at least one convex lens and is arranged to condense the light beam which is emitted from the light source 31 and stopped down by the aperture diaphragm 33, onto the optical disc 2.

The light receiving unit 35 has a substantially rectangular main beam photodetector 51 for receiving a main beam, which is the zeroth-order light split by the first diffraction grating 45, and a set of substantially band-shaped side beam photodetectors 52, 53 for receiving two side beams, which are the plus-first-order light and the minus-first-order light split by the first diffraction grating 45. The light receiving unit 53 is arranged at a position corresponding to each return light beam split by the split prism 47 of the composite optical element 32. In the light receiving unit 35, the substantially rectangular main beam photodetector 51 is arranged at the center and the set of substantially band-shaped side beam photodetectors 52, 53 are arranged on both sides of the main beam photodetector 51.

Figure 6A:
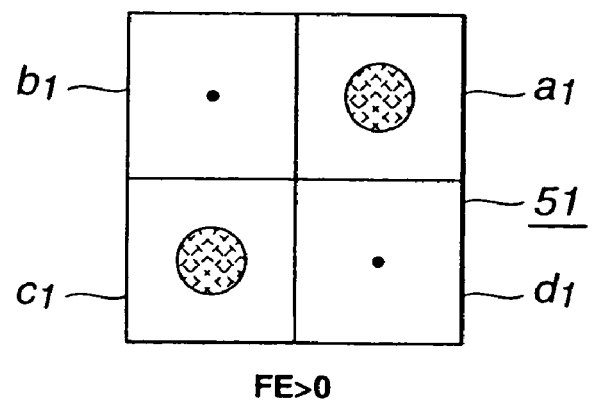
FIGS. 6A to 6C show beam spots in light receiving areas of a main beam photodetector of the optical pickup according to the present invention.
Figure 6B:
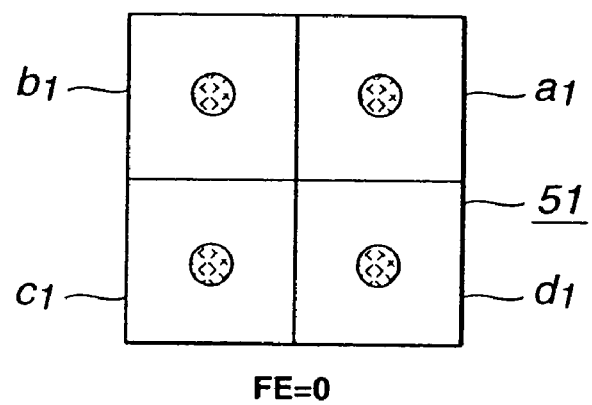
Figure 6C:
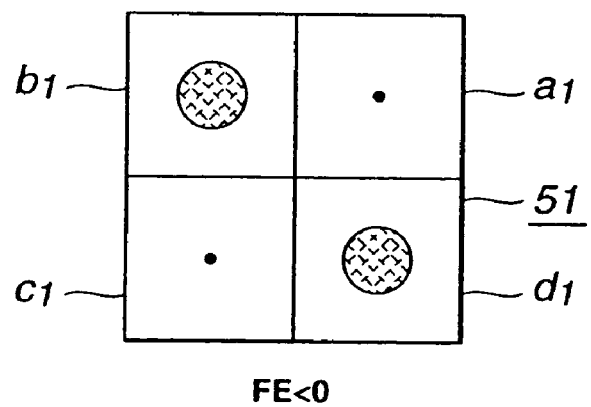

The main beam photodetector 51 of the light receiving unit 35 has light receiving areas $a_1$, $b_1$, $c_1$, $d_1$ which are formed by quadrisecting along a set of dividing lines orthogonal to each other, as shown in FIGS. 6A to 6C. These light receiving areas $a_1$, $b_1$, $c_1$, $d_1$ are irradiated with the respective return light beams formed by quadrisecting the return light beam from the optical disc by the split prism 47.

The lens driving mechanism of the optical pickup 3 has the following element, though not shown: a lens holder for holding the objective lens 34; a holder supporting member for supporting the lens holder so that the lens holder is displaceable in biaxial directions, that is, a focusing direction parallel to the optical axis of the objective lens 34 and a tracking direction orthogonal to the optical axis of the objective lens 34; and a electromagnetic driving unit for driving and displacing the lens holder in the biaxial directions by an electromagnetic force.

On the basis of a focusing error signal detected by the main beam photodetector 51 of the light receiving unit 35 and a tracking error signal detected by the side beam photodetectors 52, 53, the lens driving mechanism drives and displaces the objective lens 34 in the focusing direction and the tracking direction, thus focusing the light beam on the recording track of the recording surface $2_a$ of the optical disc 2.

In the above-described composite optical element 32, the split prism 47 may also be formed in the shape of an eight-sided pyramid. In this case, the main beam photodetector 51 of the light receiving unit 35 may be divided into eight parts along radial dividing lines from the center of the light receiving surface. While the split prism 47 of the composite optical element 35 provided inward on the first surface 41, the split prism 47 may also be projected outward from the first surface 41. Moreover, the split prism 47 of the composite optical element 35 is not limited to a pyramid having planes and may also have a plurality of curved surfaces. In this case, the divided areas of the main beam photodetectors 51 of the light receiving unit 35 are to correspond to these curved surfaces. Furthermore, the first and second diffraction gratings 45, 46 of the composite optical element 32 may be formed as hologram elements by etching a predetermined hologram pattern.

Figure 7:
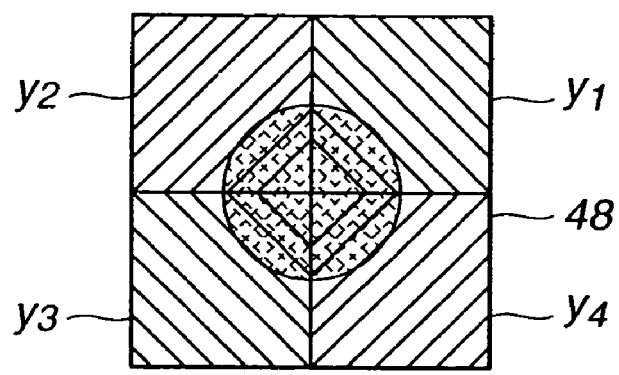
FIG. 7 is a plan view showing a grating having a function equivalent to a split prism of a composite optical element in the optical pickup according to the present invention.

Even when a grating 48 divided into four areas as shown in FIG. 7 is used in the composite optical element 32 instead of the split prism 47, a similar effect can be generated. In this case, divided areas $y_1$, $y_2$, $y_3$, $y_4$ are provided in the grating 48 in order to generate the same effect as in the case of using the split prism 47, and grooves are formed in the divided areas $y_1$, $y_2$, $y_3$, $y_4$ in different directions. Specifically, the direction of forming the grooves in the divided areas $y_1$ and $y_3$ and the direction of forming the grooves in the divided areas $y_2$ and $y_4$ are orthogonal to each other. The grating 48 diffracts and quadrisects the incident return light beam from the optical disc 2 in accordance with the directions of the grooves in the divided areas $y_1$, $y_2$, $y_3$, $y_4$ and the lattice constant, and leads the quadrisects return light beams to the main beam photodetector 51 of the light receiving unit 35. The grating 48 is particularly preferred since improvement in the diffraction efficiency and reduction in stray light are realized by using a blazed hologram.

Figure 8:
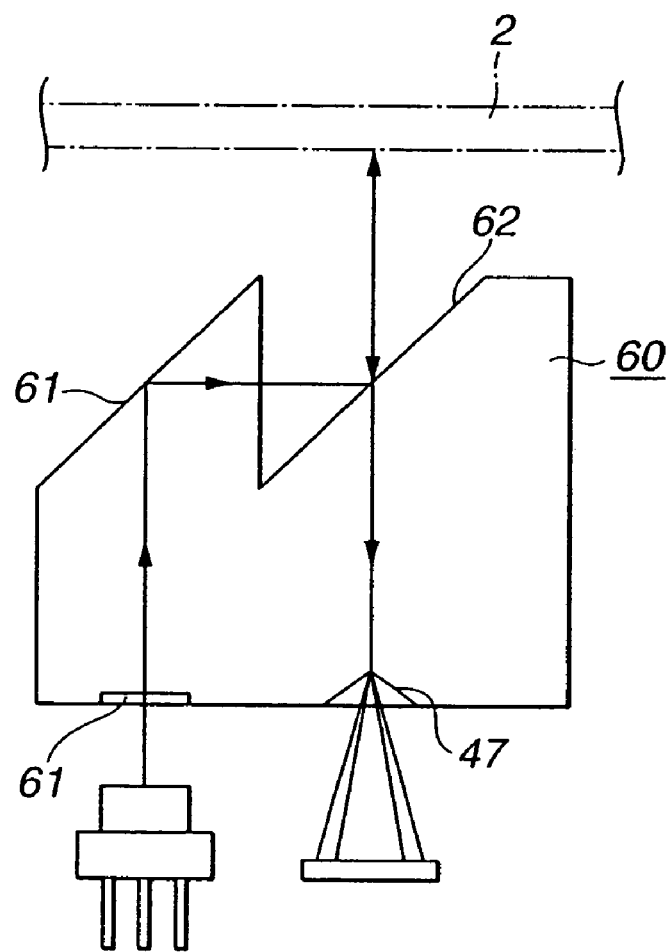
FIG. 8 shows an example in which the composite optical element of the optical pickup according to the present invention has a reflection surface.
Figure 9:
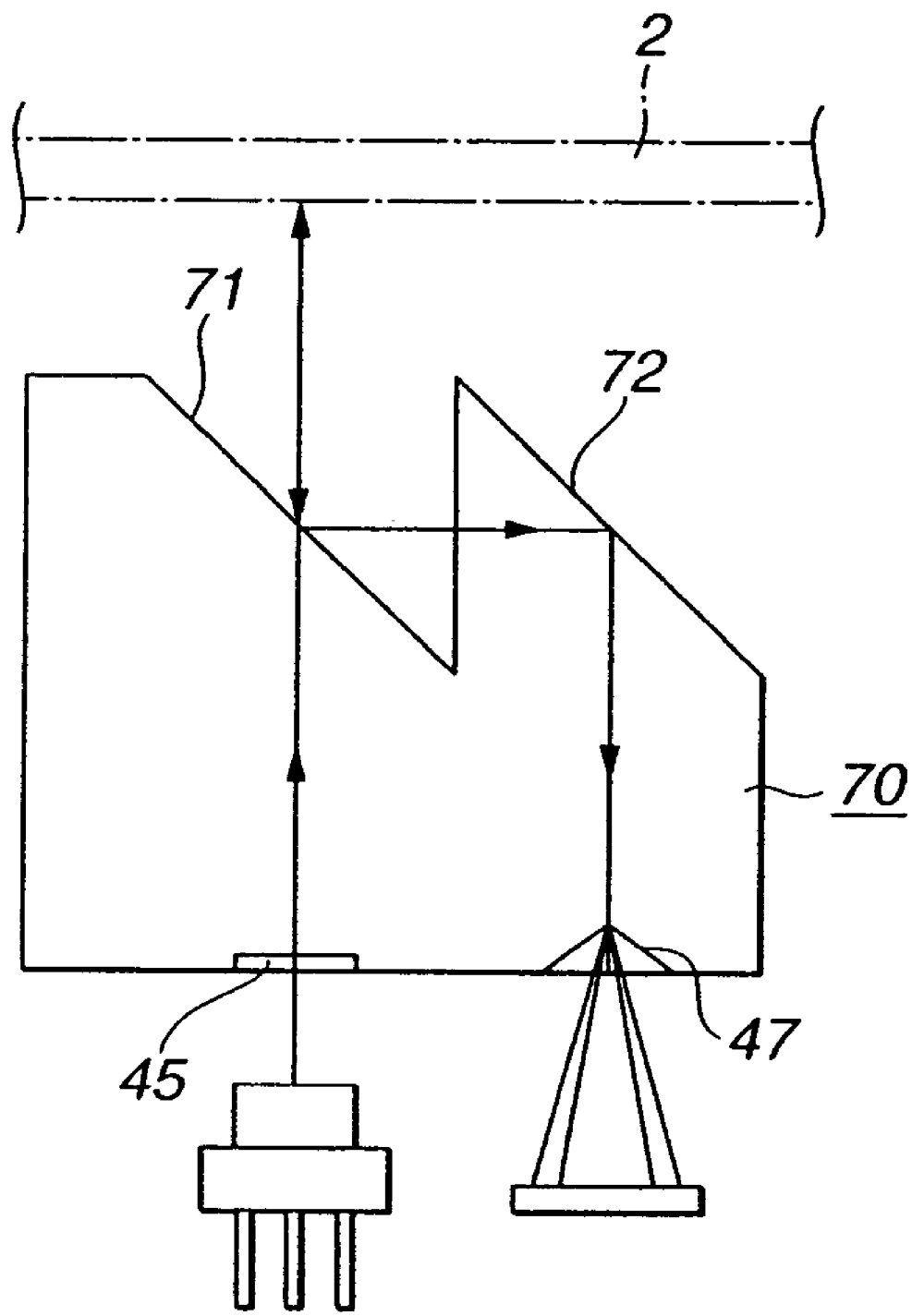
FIG. 9 shows another example in which the composite optical element of the optical pickup according to the present invention has a reflection surface.

Moreover, the composite optical element 32 may be designed to have a inner reflection surface. By using the reflection surface to bend the optical path, the degree of freedom of optical design can be improved. In this case, the composite optical element 32 may be constituted, for example, as shown in FIGS. 8 and 9. In other examples of the composite optical element 32 shown in FIGS. 8 and 9, parts substantially equivalent to those of the above-described composite optical element 32 are denoted by the same numerals and will not be described further in detail.

A composite optical element 60 shown in FIG. 8 has a first diffraction grating 45 for splitting a light beam emitted from the light source 31 into three beams, a reflection surface 61 for reflecting the light beams split by the first diffraction grating 45, a half mirror 62 for reflecting the light beams reflected by the reflection surface 61 toward the optical disc 2 and transmitting a return light beam from the optical disc 2, and a split prism 47 for quadrisecting the return light beam transmitted through the half mirror 62. In this composite optical element 60, the light beam emitted from the light source 31 is split into three beams by the first diffraction grating 45 and the light beams split by the first diffraction grating 45 are reflected by the reflection surface 61. The light beams reflected by the reflection surface 61 are reflected by the half mirror 62 toward the optical disc 2. The return light beam from the optical disc 2 is transmitted through the half mirror 62 and the return light beam transmitted through the half mirror 62 is quadrisected by the split prism 47 and led to the light receiving unit 35.

A composite optical element 70 shown in FIG. 9 has a first diffraction grating 45 for splitting a light beam emitted from the light source 31 into three beams, a half mirror 71 for transmitting the light beams split by the first diffraction grating 45 toward the optical disc 2 and reflecting a return light beam from the optical disc 2, a reflection surface 72 for reflecting the return light beam reflected by the half mirror 72, and a split prism 47 for quadrisecting the return light beam reflected by the reflection surface 72. In this composite optical element 70, the light beam emitted from the light source 31 is split into three beams by the first diffraction grating 45 and the light beams split by the first diffraction grating 45 are transmitted through the half mirror 71. The light beams reflected by the reflection surface 61 are reflected by the half mirror 62 toward the optical disc 2. The return light beam from the optical disc 2 is reflected by the half mirror 71 and the return light beam reflected by the half mirror 71 is reflected by the reflection surface 72. The return light beam reflected by the reflection surface 72 is quadrisected by the split prism 47 and led to the light receiving unit 35.

As described above, in the composite diffraction element 60 and the composite diffraction element 70, as the optical path is bent by the reflection surface 61 and the reflection surface 72, the arrangement positions of the light source 31, the split prism 47, the light receiving unit 35 and the like can be freely designed.

Moreover, in the composite optical element 32, by setting the incident angle of the return light beam from the optical disc 2 incident on the split prism 47 to be 45 degrees or less with respect to each plane of the split prism 47, that is, by setting the inclination of each plane of the split prism 47 to be 45 degrees or less, the quantity of change in the traveling direction of the return light beam split by refraction can be increased as the incident return light beam does not fall within the total reflection condition. Thus, large spacings can be provided between the divided areas of the main beam photodetector 51 and between the main beam photodetector 51 and the side beam photodetectors 52, 53. The assembly precision of the optical pickup 3 can be moderated.

Figure 10:
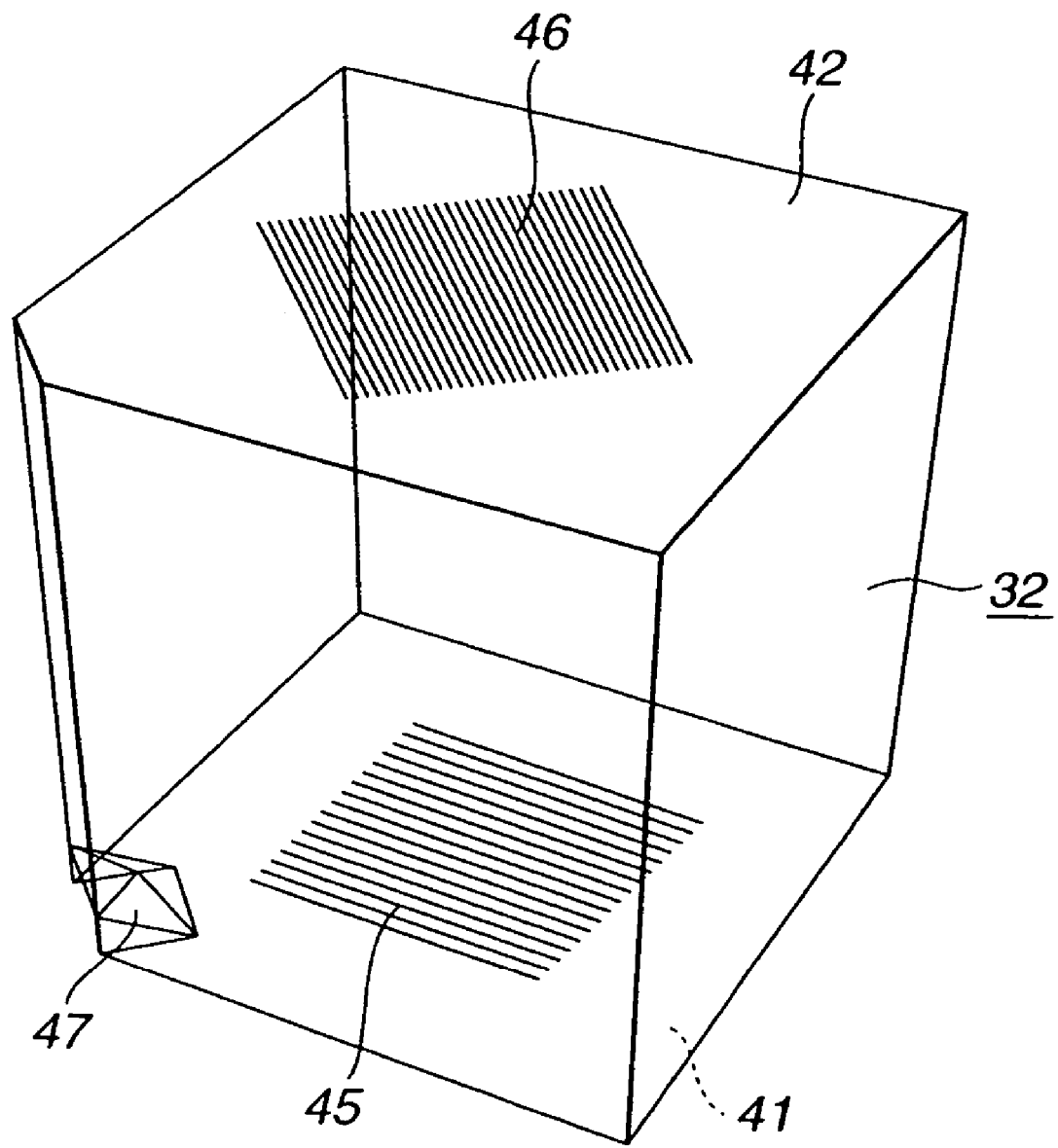
FIG. 10 shows still another example of the composite optical element of the optical pickup according to the present invention.

Furthermore, the split prism 47 may be arranged at a corner of the composite optical element 32, as shown in FIG. 10. By doing so, the processing is facilitated and the productivity of the composite optical element 32 is improved.

In the optical disc device 1 constituted as described above, a control signal is outputted from the servo circuit 10 to the biaxial actuator of the optical pickup 3 on the basis of the focusing error signal and the tracking error signal detected by the optical pickup 3 from the return light beam from the optical disc 2, and the objective lens 34 is driven and displaced in the focusing direction and the tracking direction, thus focusing the light beam on a desired recording track of the optical disc 2 via the objective lens 34. Then, in the optical disc device 1, a signal read by the optical pickup 3 is demodulated and error-corrected by the signal demodulation circuit 12 and the error correction circuit 13 and is then outputted as a reproduced signal from the interface 14.

The optical paths of a light beam and a return light beam in the optical pickup 3 of the optical disc device 1 will now be described with reference to the drawings.

In the optical disc device 1, when reproducing information from the recording surface 2a of the optical disc 2, a light beam as a laser beam emitted from the light source is split into three beams made up of zeroth-order light, plus-first-order light and minus-first-order light by the first diffraction grating 45 of the composite optical element 32, as shown in FIG. 4. The three split light beams are transmitted through the second diffraction grating 46 of the composite optical element 32 and condensed on the recording surface 2a of the optical disc 2 by the objective lens 34.

A return light beam reflected by the recording surface 2a of the optical disc 2 is diffracted by the second diffraction grating 46 of the composite optical element 32 and then led to the optical path toward the light receiving unit 35. The minus-first-order light is made incident on the vertical angle of the split prism 47. The minus-first-order light incident on the vertical angle of the regular four-sided pyramid of the split prism 47 is made incident on each circumferential surface of the regular four-sided pyramid, thus refracted in different directions and quadrisected into four return light beams. The four return light beams are cast into the light receiving areas $a_1$, $b_1$, $c_1$, $d_1$, respectively, of the main beam photodetector 51 of the light receiving unit 35.

Figure 11A:
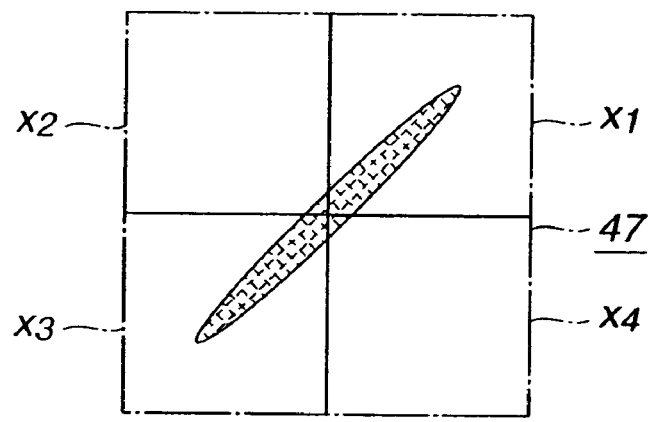
FIGS. 11A to 11C show diffracted light incident on the split prism of the composite optical element in the optical pickup.
Figure 11B:
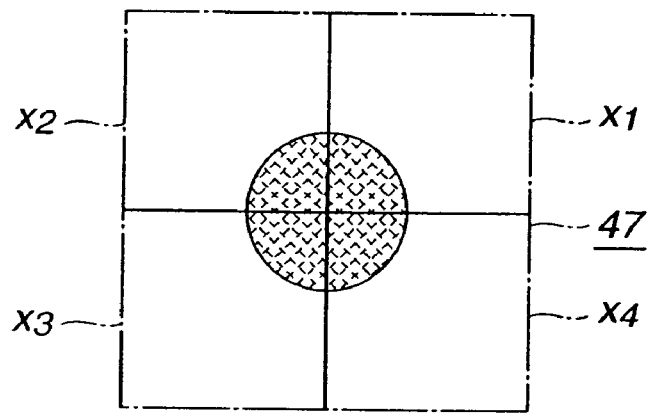

When the light diffracted by the second diffraction grating 46 is made incident on the vertical angle of the split prism 47, if the objective lens 34 is situated at the focusing position with respect to the recording surface 2a of the optical disc 2, substantially circular diffracted light is made incident on the vertical angle of the split prism 47, as shown in FIG. 11B.

If the objective lens 34 is too close to the recording surface 2a of the optical disc 2 when making the diffracted light incident on the vertical angle of the split prism 47, the objective lens 34 is out of the focusing position and astigmatism is generated by the passing of the diffracted light through the composite optical element 32. Therefore, as shown in FIG. 11A, elliptical diffracted light with its long axis raised on the right side of FIG. 11A is made incident on the vertical angle of the split prism 47.

Figure 11C:
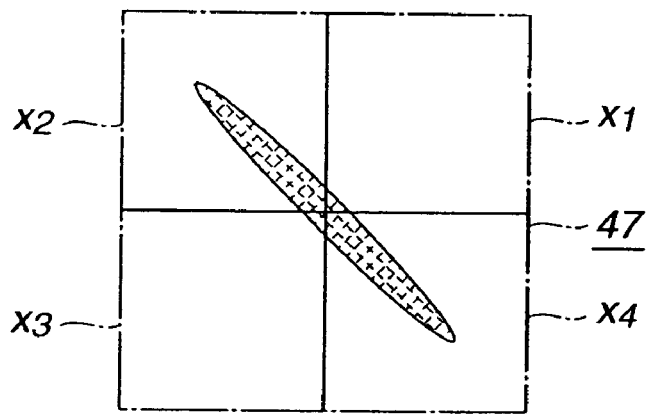

If the objective lens 34 is too far from the recording surface 2a of the optical disc 2 when making the diffracted light incident on the vertical angle of the split prism 47, the objective lens 34 is out of the focusing position and astigmatism is generated by the passing of the diffracted light through the composite optical element 32. Therefore, as shown in FIG. 11C, elliptical diffracted light with its long axis raised on the left side of FIG. 11C is made incident on the vertical angle of the split prism 47.

Thus, when making the diffracted light incident on the vertical angle of the split prism 47 in the state where the objective lens 34 is out of the focusing position, the majority of the diffracted light is incident on each circumferential surface of one of two sets of circumferential surfaces $x_1$, $x_3$ and $x_2$, $x_4$ facing each other of the split prism 47, and a very small quantity of the diffracted light is incident on each circumferential surface of the other set.

Specifically, with respect to the split prism 47 on which the elliptical diffracted light is incident as shown in FIG. 11A, the majority of the diffracted light is incident on one set of circumferential surfaces $x_1$, $x_3$ and a very small quantity of the diffracted light is incident on the other set of facing circumferential surfaces $x_2$, $x_4$. On the other hand, with respect to the split prism 47 on which the elliptical diffracted light is incident as shown in FIG. 11C, the majority of the diffracted light is incident on one set of circumferential surfaces $x_2$, $x_4$ and a very small quantity of the diffracted light is incident on the other set of facing circumferential surfaces $x_1$, $x_3$.

Of the zeroth-order light split by the first diffraction grating 45, the return light beam from the optical disc 2 is diffracted to be minus-first-order light by the second diffraction grating 46. As this minus-first-order light is made incident on the circumferential surfaces $x_1$, $x_2$, $x_3$, $x_4$ of the split prism 47, the minus-first-order light is refracted in different directions and thus split into four return light beams, which become incident on the light receiving areas $a_1$, $b_1$, $c_1$, $d_1$, respectively, of the main beam photodetector 51 of the light receiving unit 35.

Therefore, with respect to the two sets of light receiving areas $a_1$, $c_1$ and $b_1$, $d_1$ facing each other of the main beam photodetector 51, as shown in FIGS. 6A and 6C, a large quantity of light is received by one set of light receiving areas and a small quantity of light is received by the other set of light receiving areas.

Specifically, when the elliptical diffracted light as shown in FIG. 11A is incident on the split prism 47, a large quantity of light is received by the facing light receiving areas $a_1$, $c_1$ of the main beam photodetector 51 and a small quantity of light is received by the facing light receiving areas $b_1$, $d_1$, as shown in FIG. 6A. On the other hand, when the elliptical diffracted light as shown in FIG. 11C is incident on the split prism 47, a large quantity of light is received by the facing light receiving areas $b_1$, $d_1$ of the main beam photodetector 51 and a small quantity of light is received by the facing light receiving areas $a_1$, $c_1$, as shown in FIG. 6C.

When the circular diffracted light as shown in FIG. 11B is incident on the vertical angle of the split prism 47, an equal quantity of light is received by the facing light receiving areas $a_1$, $c_1$ and $b_1$, $d_1$, as shown in FIG. 6B.

Thus, if the outputs of detection by the light receiving areas $a_1$, $b_1$, $c_1$, $d_1$ of the main beam photodetector 51 are expressed by $Sa_1$, $Sb_1$, $Sc_1$, $Sd_1$, a focusing error signal FE can be calculated by the following equation (2).

$$FE=(Sa_1+Sc_1)-(Sb_1+Sd_1) \qquad (2)$$

Specifically, if the objective lens 34 is situated at the focusing position with respect to the recording surface 2a of the optical disc 2, the focusing error signal FE acquired by the main beam photodetector 51 by calculating the above-described equation (2) is 0. If the objective lens 34 is too close to the recording surface 2a of the optical disc 2, the focusing error signal FE acquired by the main beam photodetector 51 is positive. If the objective lens 34 is too far from the recording surface 2a of the optical disc 2, the focusing error signal FE is negative.

As described above, the main beam photodetector 51 of the light receiving unit 35 acquires the focusing error signal FE and the reproduced signal from the output of the beam spots incident on the light receiving areas $a_1$, $b_1$, $c_1$, $d_1$.

The side beam photodetectors 52, 53 detect the quantity of the received return light beam from optical disc 2, of the plus-first-order light and the minus-first-order light split by the first diffracting grating 54, and calculate the difference between the outputs of the plus-first-order light and the minus-first-order light, thus acquiring a tracking error signal TE.

In this manner, in the optical disc device 1, the servo circuit 10 controls the lens driving mechanism on the basis of the focusing error signal FE and the tracking error signal TE acquired by the optical pickup 3 so as to drive and displace the objective lens 34 in the focusing direction and the tracking direction. Thus, the light beam is focused on the recording surface 2a of the optical disc 2 and information is reproduced from the optical disc 2.

As described above, in the optical disc device 1, since the optical pickup 3 has the composite optical element 32 which has the second diffraction grating 46 for diffracting a return light beam from the optical disc 2 and the split prism 47 for splitting minus-first-order light diffracted by the second diffraction grating 46, the return light beam is split on the optical path, compared with the format in which the beam spot is split by dividing lines on the main beam photodetector as in the above-described conventional optical system 101. Therefore, by securing a predetermined size of the light receiving areas $a_1$, $b_1$, $c_1$, $d_1$ of the main beam photodetector 51 so as to receive the four return light beams split by the split prism 47, the precision required for the dividing position or the like on the main beam photodetector is moderated. Therefore, with the optical disc device 1, it is possible to reduce the manufacturing cost of the main beam photodetector 51 of the optical pickup 3 and to easily adjust the position of the main beam photodetector 51 in the manufacturing process of the optical pickup 3. The reliability of the resultant focusing error signal FE can be improved.

In the optical disc device 1 according to the present invention, the composite optical element 32 in the optical pickup 3 covers the functions of the diffraction grating 112 and the beam splitter 113 of the above-described conventional optical system 101. Therefore, it is possible to restrain the number of optical components to the minimum, realize simplification and miniaturization of the structure of the optical system 30, and reduce the manufacturing cost.

Thus, as the optical system 30 in the optical pickup 3 has the composite optical element 32, the optical disc device 1 according to the present invention enables improvement in the productivity, reduction in the manufacturing cost and improvement in the reliability.

In the optical disc device 1 according to the present invention, the number of components and the manufacturing cost can be further reduced by constituting the optical pickup 3 as an optical unit having the light source 31 integrated with the light receiving unit 35.

While a so-called astigmatism method is employed in the optical disc device 1 according to the present invention in order to acquire the focusing error signal FE in the optical pickup 3, another detection method such as the Foucault method may also be used.

INDUSTRIAL APPLICABILITY

As described above, the composite optical element according to the present invention, and the optical pickup and the optical disc using this optical element, enable improvement in the productivity, reduction in the manufacturing cost, and improvement in the reliability of the focusing error signal.

The invention claimed is:

1. An optical pickup device comprising:
   a light source for emitting light of a predetermined wavelength;
   an objective lens for condensing the light beam emitted from the light source onto an optical disc and condensing a return light beam from the optical disc;
   a composite optical element having a diffraction element for transmitting the light beam emitted from the light source and diffracting the return light beam from the optical disc, and light splitting means arranged at a position where the return light beam diffracted by the diffraction element is incident and adapted for splitting the return light beam into a plurality of beams; and
   light receiving means for receiving each return light beam split by the light splitting means, in a plurality of light receiving areas, in order to acquire a focusing error signal, wherein the prism is formed in a substantially four-sided pyramidal shape and quadrisects the return light beam diffracted by the diffraction element,
   wherein the composite optical element further comprises another diffraction element provided on an optical path between the light source and the diffraction element and adapted for trisecting the light beam emitted from the light source into zeroth-order light, plus-first-order light and minus-first-order light, and
   the light receiving means receives the zeroth-order light split by said another diffraction means, of the return light beams split by the light splitting means, in order to acquire a focusing error signal, and receives the plus-first-order light and the minus-first-order light split by said another diffraction element in order to acquire a tracking error signal, wherein the prism is formed in a substantially four-sided pyramidal shape and quadrisects the return light beam diffracted by the diffraction element.

2. The optical pickup device as claimed in claim 1, wherein the diffraction element, the light splitting means and said another diffraction element of the composite optical element are integrally molded using a resin material.

3. The optical pickup device as claimed in claim 1, wherein said another diffraction element is a hologram.

4. An optical disc device having an optical pickup for recording and/or reproducing information signals to and/or from an optical disc, and disc rotational driving means for rotationally driving the optical disc, the optical pickup comprising:
   a light source for emitting light of a predetermined wavelength;
   an objective lens for condensing the light beam emitted from the light source onto the optical disc and condensing a return light beam from the optical disc;
   a composite optical element having a diffraction element for transmitting the light beam emitted from the light source and diffracting the return light beam from the optical disc, and light splitting means arranged at a position where the return light beam diffracted by the diffraction element is incident and adapted for splitting the return light beam into a plurality of beams;
   light receiving means for receiving each return light beam split by the light splitting means, in a plurality of light receiving areas, in order to acquire a focusing error signal, wherein the prism is formed in a substantially four-sided pyramidal shape and quadrisects the return light beam diffracted by the diffraction element,
   wherein the composite optical element further comprises another diffraction element provided on an optical path between the light source and the diffraction element and adapted for trisecting the light beam emitted from the light source into zeroth-order light, plus-first-order light and minus-first-order light, and
   the light receiving means receives the zeroth-order light split by said another diffraction means, of the return light beams split by the light splitting means, in order to acquire a focusing error signal, and receives the plus-first-order light and the minus-first-order light split by said another diffraction element in order to acquire a tracking error signal, wherein the prism is formed in a substantially four-sided pyramidal shape and quadrisects the return light beam diffracted by the diffraction element.

5. The optical disc device as claimed in claim 4, wherein the diffraction element, the light splitting means and said another diffraction element of the composite optical element are integrally molded using a resin material.

6. The optical disc device as claimed in claim 4, wherein said another diffraction element is a hologram.

* * * * *